United States Patent [19]

Rucker

[11] Patent Number: 4,710,225
[45] Date of Patent: Dec. 1, 1987

[54] REFRACTORY CEMENT

[76] Inventor: Robert A. Rucker, 25 Timberlake Dr., Orchard Park, N.Y. 14127

[21] Appl. No.: 866,275

[22] Filed: May 23, 1986

[51] Int. Cl.$^4$ .............................................. C04B 7/32
[52] U.S. Cl. ................................... 106/104; 501/124; 501/141
[58] Field of Search ................. 106/104; 501/124, 141

[56] References Cited

U.S. PATENT DOCUMENTS

| | | | |
|---|---|---|---|
| 2,840,480 | 6/1958 | Stoddard | 501/124 |
| 3,010,835 | 11/1961 | Charles et al. | 106/104 |
| 3,181,959 | 5/1965 | Raine et al. | 106/104 |
| 4,055,437 | 10/1977 | Petrak | 106/104 |

*Primary Examiner*—William R. Dixon, Jr.
*Assistant Examiner*—Steven Capella
*Attorney, Agent, or Firm*—Christel, Bean & Linihan

[57] ABSTRACT

A composition of refractory cement includes about 65 percent by weight of refractory clay, about 15 percent by weight of ball clay and about 20 percent by weight of calcium aluminate cement to yield a product composition which is air-setting, acid resistant, and non water soluble. The composition ingredients are so sized to provide the product composition with a screen analysis of about 2 percent to 6 percent +40 mesh, about 20 percent to 35 percent +70 mesh, 10 percent to 25 percent +100 mesh and 40 percent to 60 percent −100 mesh.

10 Claims, No Drawings

REFRACTORY CEMENT

BACKGROUND OF THE INVENTION

This invention relates generally to refractory cement and relates more particularly to a new and improved refractory cement composition.

The refractory cement with which this invention is concerned is intended to be used as a joint compound in masonry structures expected to be exposed to high temperatures. Examples of such masonry structures include chimneys and fireplaces in which high temperature materials, such as clay flue liners or firebrick, are sealed or bonded together with the refractory cement. Refractory cements characteristically possess a high resistance to heat and, accordingly, are commonly referred to as high temperature cements.

A type of cement with which this invention is not to be compared is commonly referred to as a castable or insulating castable, such as is described in U.S. Pat. No. 3,718,489. While, on one hand, castables are comprised of ingredients having a course mesh aggregate size, refractory cements, on the other hand, are comprised of ingredients ground to a fine consistency so as to provide compositions of ingredients with a fine mesh aggregate size. Furthermore, insulating castables possess insulating characteristics due primarily to the utilization of expanded clay in the manufacture of the castable, and both castables and insulating castables may be used as a high temperature concrete to cast objects of a predetermined shape or to cast a hearth or wall section, for example, of a furnace. In contrast, refractory cements do not include expanded clay nor are intended to insulate and are used primarily as high temperature cements used to seal or bond high temperature masonry materials such as firebrick and clay flue liners.

Inasmuch as there exists conventional refractory cements for bonding or sealing high temperature masonry materials together, conventional refractory cements possess limitations. One such limitation is directed to the fact that such conventional cements are water soluble when in a cured, or hardened, condition. The exposure of these water soluble cements, when in a cured condition, to water such as may result from rainwater or a condensation of combustion products flowing down a chimney or flue tends to soften, and thus weaken, a masonry joint formed with the refractory cement. A sufficient softening of the joint, such as may result from prolonged exposure to moisture, may cause the cement to flow out of the joint.

Another limitation associated with conventional refractory cements relates to the workability of the conventional cements. More specifically, such refractory cements are commonly adapted to dry or cure in a relatively short amount of time requiring that the cement, once mixed with water, be worked relatively quickly. Some conventional refractory cements are further limited in that they require heat to harden properly or are not acid resistant in service. Inasmuch as creosote is known to contain acid, exposure of such a conventional refractory cement to creosote can have undesirable effects on the structural stability of joints comprised of the refractory cement.

Accordingly, it is an object of the present invention to provide a new and improved refractory cement which circumvents the aforediscussed limitations associated with conventional refractory cements.

Another object of the present invention is to provide such a refractory cement which is air-setting, once mixed with water.

Still another object of the present invention is to provide such a refractory cement which is non water soluble when in its hardened or cured condition.

Yet still another object of the present invention is to provide such a refractory cement which possesses a relatively high resistance to acid.

A further object of the present invention is to provide such a refractory cement which is effective in operation and economical to manufacture.

SUMMARY OF THE INVENTION

This invention resides in a new and improved composition of refractory cement.

The refractory cement of this invention is comprised of refractory clay, ball clay and calcium aluminate cement mixed together in such amounts that the cement is rendered air-curable to a hardened, cured condition and which is non water soluble when cured.

Inasmuch as conventional refractory cements commonly include a sodium silicate binder, the composition of this invention utilizes calcium aluminate cement instead of a sodium silicate binder. It is believed that the substitution of calcium aluminate for the sodium silicate is partly responsible for the resulting air-setting and non water soluable characteristics of the composition.

DETAILED DESCRIPTION OF AN ILLUSTRATIVE EMBODIMENT

The composition of the present invention includes refractory clay, ball clay and calcium aluminate cement blended in such amounts to provide a refractory, or high temperature, cement composition which is air-setting, acid resistant and non water soluble. The refractory clay of the composition is a non-basic (acidic) size graded aggregate which can be selected from such materials as aluminae, bauxite clays, diaspore clays, kaolinite clays and other fire clays inclusive of silica and silica aluminae refractories. Furthermore, the aforementioned refractory clays may be calcined, or fired, and be well-suited as an ingredient of the composition of this invention.

Due to the general availability and low cost of kaolinite clays, such as kyanite, in comparison to the other refractory clays suggested above, the kaolinite clays may provide a preferred form of refractory clay. It has been found that kaolinite clays which are well-suited for use in the composition of this invention can be any of several clays such as Missouri flint fire clay, kyanite from Virginia, Lincoln fire-clay from California, and other kyanite and silica clays commonly found in Pennsylvania, Ohio, Maryland, the Carolinas, Georgia and Alabama.

In accordance with the present invention, the percentage by weight of refractory clay in the composition of this invention is within the range of about 50 to 70 percent.

The ball clay of the composition is primarily responsible for the texture, and thus the handling and working characteristics, of the cement mix. It has been found that too small an amount of ball clay within the composition renders a mix which is difficult to shape while too great of an amount of ball clay within the composition increases the likelihood of shrinkage of a finished joint. For a suitable mix texture, it has been found that percentage by weight of ball clay in the composition of this invention is within the range of about 10 percent to 30 percent, and is preferably about 15 percent.

The calcium aluminate cement of the type contained in the composition of this invention includes such cement known as Fondu, Refcon, Alcoa CA-25 and Lumnite. Of the aforementioned examples, Lumnite is a preferred form of calcium aluminate cement due to its relatively low cost, general availability and proven performance in service.

It has been found that too small an amount of calcium aluminate cement in the composition adversely effects the strength of the cured, or hardened, mix of the composition while too large of an amount generally increases cost of the product composition and decreases the setting time of the uncured mixture. It has been found that a percentage by weight of calcium aluminate cement in the composition within the range of about 10 to 30 percent provides a composition yielding a strong mix and a desirable setting time. A percentage by weight of calcium aluminate cement in the composition of about 20 percent has been found to provide a mixture of the composition with preferred strength and set time.

The refractory clay, ball clay and calcium aluminate cement of the composition are blended together to yield a Tyler screen analysis of the composition as follows:

| Mesh Size | Percent by Weight Retained in The Screen | Percent By Weight Retained in The Screen of An Illustrative Composition |
| --- | --- | --- |
| +8 | 0 | 0 |
| +20 | 0 | 0 |
| +40 | 2%-6% | 4.5% |
| +70 | 20%-35% | 27.0% |
| +100 | 10%-25% | 16.0% |
| −100 | 40%-60% | 52.5% |
| TOTAL: | | 100% |

For purposes of illustration, a refractory cement composition in accordance with this invention and which has been found suitable for use in refractory cement applications having a maximum service temperature of about 2400° Fahrenheit includes the following chemical analysis and ingredients:

| Analysis | Ingredients |
| --- | --- |
| $SiO_2$ 69% | 65% Kyanite |
| $Fe_2O_3$ 1.5% | 15% Ball Clay |
| $Al_2O_3$ 18% | 20% Calcium aluminate cement |
| $TiO_2$ 2.5% | |
| CaO/MgO 7.5% | |
| Alkalies 1.5% | |

In order to use the composition of this invention, the composition is transported, commonly in bags, to the job site and mixed with water to saturate the particles of the composition and thus provide the resultant mix with a suitable consistency. It has been found that approximately 0.75 to 1.25 quarts of water must be mixed with every ten pounds of composition to provide a mix of suitable texture and workability.

I claim:

1. A refractory cement comprising refractory clay, ball clay and calcium aluminate cement mixed together in such amounts that said refractory cement is adapted to be air-cured to a hardened condition and which is non water soluble when in a hardened, cured condition, the refractory cement having a Tyler screen analysis of about 2 percent to 6 percent +40 mesh, 20 percent to 35 percent +70 mesh, 10 percent to 15 percent +100 mesh and 40 percent to 60 percent −100 mesh, the percentage by weight of the refractory clay in the composition of said refractory cement is in the range from about 50 percent to 70 percent, and the percentage by weight of the ball clay in the composition of said refractory cement is in the range from about 10 percent to 30 percent.

2. A refractory cement as defined in claim 1 wherein the percentage by weight of calcium aluminate cement in the composition of said refractory cement is in the range of about to 10 percent to 20 percent.

3. A refractory cement as defined in claim 1 wherein said refractory clay is chosen from a non-basic size graded aggregate group consisting of aluminae, bauxite clays, and diaspore clays, kaolinite clays and other fireclays.

4. A refractory cement as defined in claim 1 wherein said calcium aluminate cement is chosen from a cement group consisting of cements of the type such as is known as Fondu, Refcon, Alcoa CA-25 and Lumnite.

5. A refractory cement comprising a refractory clay, a ball clay and a calcium aluminate cement, the percentage by weight of refractory clay in the composition of said refractory cement being in the range of about 50 percent to 70 percent, the percentage by weight of ball clay in said refractory cement being in the range from about 10 percent to 30 percent, the percentage by weight of calcium aluminate cement in said refractory cement composition being within the range from about 10 percent to 30 percent, and the refractory cement having a Tyler screen analysis of about 2 percent to 6 percent +40 mesh, 20 percent to 35 percent +70 mesh, 10 percent to 25 percent +100 mesh and 40 percent to 60 percent −100 mesh.

6. A refractory cement having a Tyler screen analysis of about 2 percent to 6 percent +40 mesh, 20 percent to 35 percent +70 mesh, 10 percent to 25 percent +100 mesh and 40 percent to 60 percent −100 mesh comprising refractory clay, ball clay and calcium aluminate cement, the percentage by weight of refractory clay in the composition of said refractory cement is in the range from about 50 percent to 70 percent, and the percentage by weight of ball clay in the composition of said refractory cement is in the range from about 10 percent to 30 percent.

7. A refractory cement as defined in claim 6 wherein the percentage by weight of refractory clay in the composition of said refractory cement is about 65 percent.

8. A refractory cement as defined in claim 6 wherein the percentage by weight of ball clay in the composition of said refractory cement is about 15 percent.

9. A refractory cement as defined in claim 6 wherein the percentage by weight of calcium aluminate cement in the composition of said refractory cement is in the range from about 10 percent to 30 percent.

10. A refractory cement as defined in claim 9 wherein the percentage by weight of calcium aluminate cement is about 20 percent.

* * * * *